US010442350B2

(12) United States Patent
Chen et al.

(10) Patent No.: US 10,442,350 B2
(45) Date of Patent: Oct. 15, 2019

(54) VEHICLE INTERIOR LIGHT ASSEMBLY WITH REFLECTOR AND LENS

(71) Applicant: Ford Global Technologies, LLC, Dearborn, MI (US)

(72) Inventors: Linsheng Chen, Woodbury, MN (US); Steven J. Antilla, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/609,186

(22) Filed: May 31, 2017

(65) Prior Publication Data

US 2018/0345857 A1    Dec. 6, 2018

(51) Int. Cl.
*B60Q 3/76* (2017.01)
*B60Q 3/80* (2017.01)
*B60Q 3/60* (2017.01)

(52) U.S. Cl.
CPC ............. *B60Q 3/76* (2017.02); *B60Q 3/60* (2017.02); *B60Q 3/80* (2017.02)

(58) Field of Classification Search
CPC .. B60Q 3/0279; B60Q 3/0203; B60Q 3/0293; B60Q 3/001
See application file for complete search history.

(56) References Cited

U.S. PATENT DOCUMENTS

| 5,525,763 | A | * | 6/1996 | Van Liere | ............ | H05K 3/0052 |
| | | | | | | 174/260 |
| 6,132,072 | A | | 10/2000 | Turnbull et al. | | |
| 6,283,621 | B1 | * | 9/2001 | Macri | ...................... | B60Q 3/74 |
| | | | | | | 362/245 |
| 7,261,450 | B2 | * | 8/2007 | Tiesler | ..................... | B60Q 3/82 |
| | | | | | | 362/259 |
| 7,281,818 | B2 | | 10/2007 | You et al. | | |
| 7,434,962 | B2 | * | 10/2008 | Stache | ..................... | B60Q 3/44 |
| | | | | | | 362/274 |
| 7,566,154 | B2 | | 7/2009 | Gloisten et al. | | |
| 7,717,593 | B2 | * | 5/2010 | Clark | ..................... | B64D 11/00 |
| | | | | | | 362/470 |
| 7,954,984 | B2 | * | 6/2011 | Okawa | ..................... | B60Q 3/85 |
| | | | | | | 362/488 |
| 8,740,424 | B2 | * | 6/2014 | Hessling | ................ | B64D 47/04 |
| | | | | | | 362/470 |

(Continued)

FOREIGN PATENT DOCUMENTS

| CN | 203131657 U | 8/2013 |
| WO | 2008039366 A2 | 4/2008 |

*Primary Examiner* — Bryon T Gyllstrom
(74) *Attorney, Agent, or Firm* — Vichit Chea; Price Heneveld LLP

(57) ABSTRACT

A light assembly for a vehicle comprises: a light source that emits light; a reflector that reflects the light emitted by the light source to a reflected focal point; and an optical device through which the light emitted by the light source transmits, the optical device having an optical focal point; wherein the optical focal point and the reflected focal point are approximately the same focal point. The light leaving the optical device is directed toward a target illuminance area that allows a driver or passenger of the vehicle to read. The light source is an LED. The optical device is a lens. The reflector is an elliptical reflector. The light assembly further comprises a printed circuit board and the LED is mounted on the printed circuit board.

6 Claims, 3 Drawing Sheets

(56) References Cited

U.S. PATENT DOCUMENTS

| | | | |
|---|---|---|---|
| 2005/0162857 A1* | 7/2005 | Tsukamoto | F21V 7/0091 |
| | | | 362/509 |
| 2006/0028831 A1* | 2/2006 | Ishida | F21S 41/17 |
| | | | 362/509 |
| 2006/0215415 A1* | 9/2006 | Suzuki | F21S 41/155 |
| | | | 362/539 |
| 2009/0231874 A1* | 9/2009 | Kishimoto | B60Q 1/04 |
| | | | 362/538 |
| 2011/0032722 A1* | 2/2011 | Ishida | F21S 41/147 |
| | | | 362/538 |
| 2011/0170306 A1* | 7/2011 | Yatsuda | B29C 45/0025 |
| | | | 362/512 |
| 2011/0205748 A1* | 8/2011 | Yatsuda | F21S 41/147 |
| | | | 362/517 |
| 2016/0047520 A1* | 2/2016 | Suzuki | F21S 41/147 |
| | | | 362/514 |

\* cited by examiner

VEHICLE INTERIOR LIGHT ASSEMBLY WITH REFLECTOR AND LENS

FIELD OF THE INVENTION

The present invention generally relates to a light assembly to direct light into an interior of a vehicle.

BACKGROUND OF THE INVENTION

The interior of vehicles sometimes include light assemblies with a light source to allow an operator or passenger of the vehicle to see an item in the interior when sunlight is not available. However, when the light source is provided by a light emitting diode (LED) controlled by a printed circuit board, the LED is often mounted on a satellite board in electrical communication with the printed circuit board to position the light source physically closer to a lens, in order to provide light appropriate for reading. The present invention obviates the need to use a satellite board to so position the LED.

SUMMARY OF THE INVENTION

According to a first aspect of the present invention, a light assembly for a vehicle comprises: a light source that emits light; a reflector that reflects the light emitted by the light source to a reflected focal point; and an optical device through which the light emitted by the light source transmits, the optical device having an optical focal point; wherein the optical focal point and the reflected focal point are approximately the same focal point.

Embodiments of the first aspect of the invention can include any one or a combination of the following features:
- the light leaving the optical device is directed toward a target illuminance area that allows a driver or passenger of the vehicle to read;
- the light source is an LED;
- the optical device is a lens;
- the reflector is an elliptical reflector;
- the light assembly further comprises a printed circuit board, wherein the LED is mounted on the printed circuit board; and
- the distance between the printed circuit board and the optical device is 10 millimeters or longer.

According to a second aspect of the present invention, a vehicle comprises: an interior; an overhead console accessible from the interior; and a light assembly providing light from the overhead console to the interior, the light assembly comprising a light source that emits the light, a reflector that reflects the light emitted by the light source to a reflected focal point, an optical device through which the light emitted by the light source and reflected by the reflector to the reflected focal point transmits, the optical device having an optical focal point; wherein the optical focal point and the reflected focal point are approximately the same focal point.

Embodiments of the second aspect of the invention can include any one or a combination of the following features:
- the vehicle further comprises a seating assembly in the interior, wherein the light assembly directs the light provided by the light assembly toward the seating assembly;
- the light source is an LED;
- the vehicle further comprises a printed circuit board, wherein the LED is mounted to the printed circuit board;
- the reflector is an elliptical reflector;
- the optical device is a lens; and
- the lens causes the light exiting the lens to be more collimated than the light entering the lens.

According to a third aspect of the present invention, a method of configuring components of a light assembly to direct light provided by the light assembly to a target illuminance area within an interior of a vehicle using an LED as a light source of the light assembly without mounting the LED to a satellite board comprises: locating a light assembly that utilizes a satellite board between an LED and a printed circuit board; mounting the LED on the printed circuit board; determining the dimensions of a reflector that reflects light that a light source of the LED emits to a reflected focal point that at least approximately coincides with an optical focal point of an optical device; and positioning the reflector adjacent the LED such that the reflected focal point at least approximately coincides with the optical focal point.

Embodiments of the third aspect of the invention can include any one or a combination of the following features:
- the light directed to the target illuminance area is appropriate for reading;
- the reflector is an elliptical reflector;
- the optical device is a lens;
- the vehicle further comprises an overhead console and the light assembly provides light from the overhead console to the interior; and
- the vehicle further comprises a seating assembly in the interior and the target illuminance area is between the seating assembly and the light assembly, and the dimensions of the reflector reflect the light to a reflected focal point that coincides with the optical focal point of the optical device and the reflector is positioned adjacent the LED such that the reflected focal point coincides with the optical focal point.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
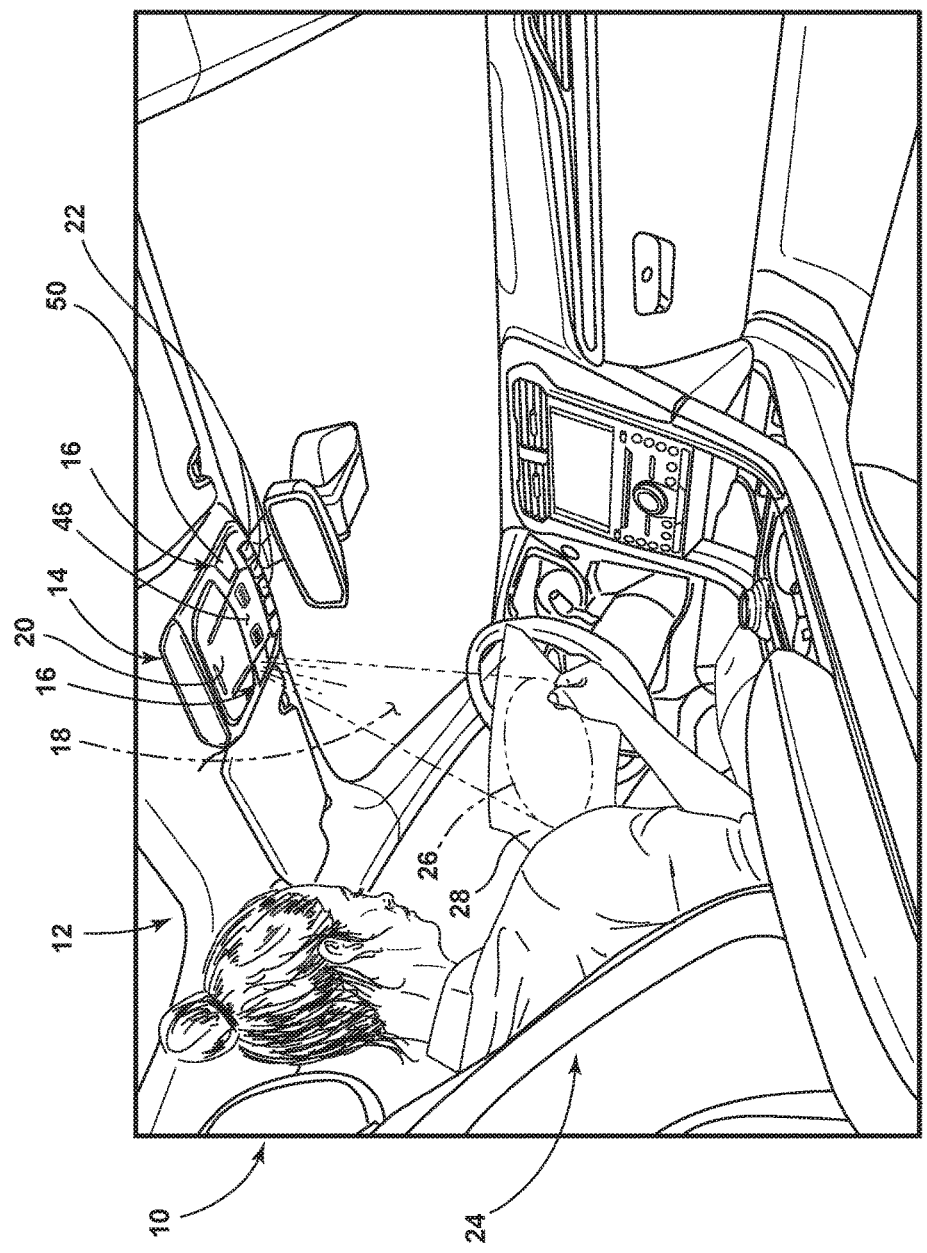
FIG. 1 is a perspective view of an interior of a vehicle illustrating a light assembly disposed at an overhead console providing light to the interior.

For purposes of description herein, the terms "upper," "lower," "right," "left," "rear," "front," "vertical," "horizontal," "interior," "exterior," "vehicle forward," "vehicle rearward" and derivatives thereof shall relate to the invention as oriented in FIG. 1. However, the invention may assume various alternative orientations, except where expressly specified to the contrary. Also, the specific devices and assemblies illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a vehicle 10 includes an interior 12. The vehicle 10 further includes an overhead console 14 that is accessible from the interior 12. The vehicle 10 further includes one or more light assemblies 16 that provide light 18 to the interior 12. The light assembly 16 is located at the overhead console 14 and thus provides light 18 from the overhead console 14 to the interior 12. The overhead console 14 may further comprise additional accessories such as a storage bin 20 and various user inputs 22.

The vehicle 10 further comprises a seating assembly 24 in the interior 12. The light assembly 16 directs the light 18 provided by the light assembly 16 toward the seating assembly 24. More specifically, the light assembly 16 directs the light 18 provided by the light assembly 16 to a target illuminance area 26 within the interior 12. The light 18 directed to the target illuminance area 26 is appropriate for reading, i.e., allows a driver or passenger sitting in the seating assembly 24 of the vehicle 10 to read an item 28, for example a map. In such a circumstance, the target illuminance area 26 can be between the seating assembly 24 and the light assembly 16.

Figure 2:
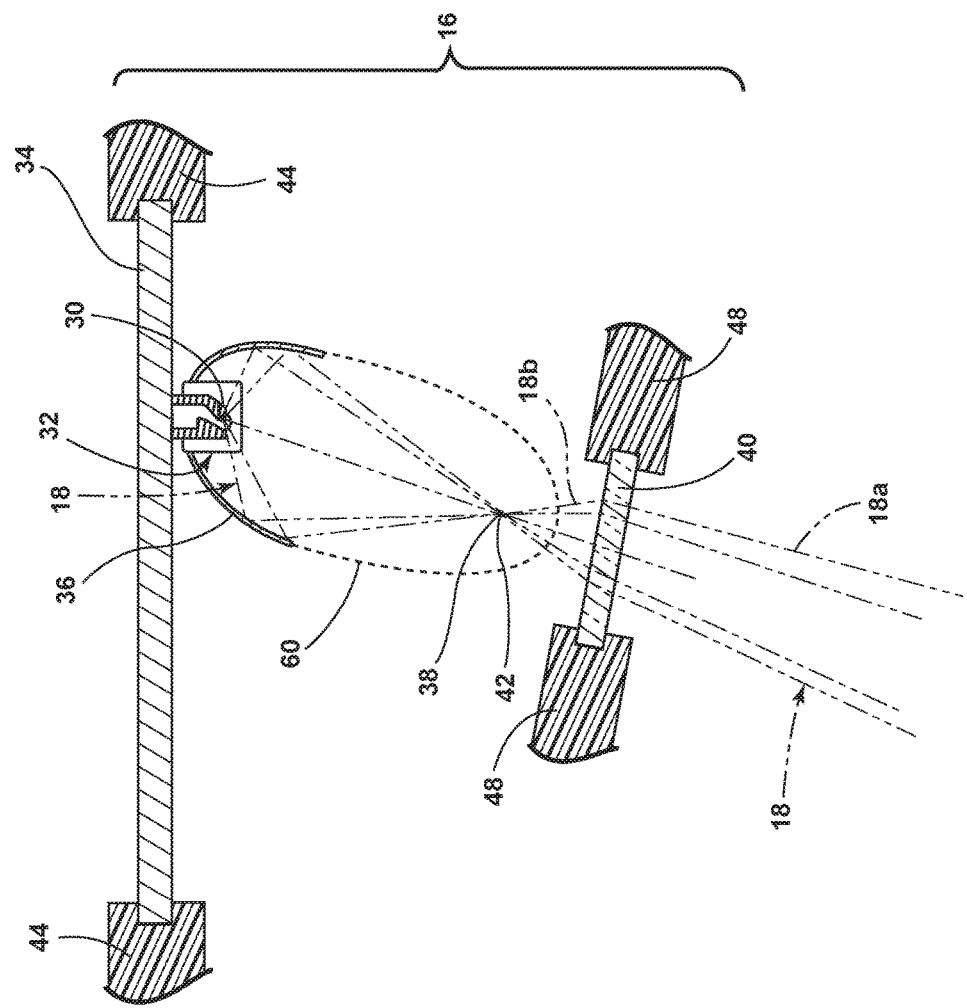
FIG. 2 is a cross-sectional schematic view of the light assembly of FIG. 1, illustrating a reflector reflecting the light that a light source emits to a reflected focal point that coincides with the optical focal point of an optical device.

Referring to FIG. 2, the light assembly 16 includes a light source 30. The light source 30 is capable of emitting light 18 and emits the light 18, when activated, that the light assembly 16 provides. The light source 30 can be one or more LEDs (light emitting diodes) 32, including a white light emitting LED, an RGB LED, among other LEDs. The light assembly 16 can further include a printed circuit board 34, and the LED 32 is mounted on the printed circuit board 34. The light source 30 need not be an LED and instead could be the light emitting end of a light pipe, among other things.

The light assembly 16 further includes a reflector 36. The reflector 36 reflects the light 18 emitted by the light source 30 to a reflected focal point 38. The reflector 36 can be an elliptical reflector, which has a cross-section following the contour of an ellipse shape 60. Elliptical reflectors direct light 18 emitted by a light source 30 to a single point, e.g., the reflected focal point 38. In addition, elliptical reflectors reflect the light 18 that the light source 30 emits to the side of the light source 30, which lessens the leak of the light 18 to areas unintended to receive light 18.

The light assembly 16 further includes an optical device 40. The light 18 that the light source 30 emits transmits through the optical device 40. The optical device 40 has an optical focal point 42. The optical device 40 is positioned such that the optical focal point 42 of the optical device 40 is between the light source 30 and the optical device 40. The optical focal point 42 for the optical device 40 and the reflected focal point 38 are approximately the same point, and preferably are the same point, as is the situation illustrated in FIG. 2. The optical device 40 can be a lens, such as a Fresnel lens, an aspherical lens, or another type of refractive lens, a light pipe, among other things. The optical device 40, such as a lens, causes the light 18a exiting the optical device 40 to be more collimated than the light 18b entering the optical device 40. Such increased degree of collimation renders the light 18a suitable for reading. In the illustrated embodiment, the light 18a exiting the optical device 40 is more collimated not orthogonally to the printed circuit board 34.

A support structure 44 can hold the light source 30 in place at a desired position within the vehicle 10. The support structure 44, for example, may be positioned behind an external surface facing the interior 12, such as the external surface 46 (see FIG. 1) of the overhead console 14. Another support structure 48 can likewise hold the optical device 40 in place at a desired position within the vehicle 10. A translucent cover 50 may be positioned flush with the external surface 46 and separate the light assembly 16 from the interior 12, while allowing the light 18 to transmit through the translucent cover 50 into the interior 12. If the light assembly 16 is part of the overhead console 14 (as in FIG. 1) and the light source 30 is provided by LED 32 mounted on a printed circuit board 34, the distance between the printed circuit board 34 and the optical device 40 can be 10 millimeters or longer. Such a distance is typically too great for the light 18 provided by the light source 30 from an LED 32 to be suitable for reading after the light 18 is transferred through the optical device 40, thus typically necessitating the use of a satellite board to move the LED 32 closer to the optical device 40. However, by utilizing the reflector 36 to reflect the light to the reflected focal point 38 approximately coinciding with the optical focal point 42 of the optical device 40, the LED 32 can be directly mounted to the printed circuit board 34 without the need of a satellite board.

Figure 3:
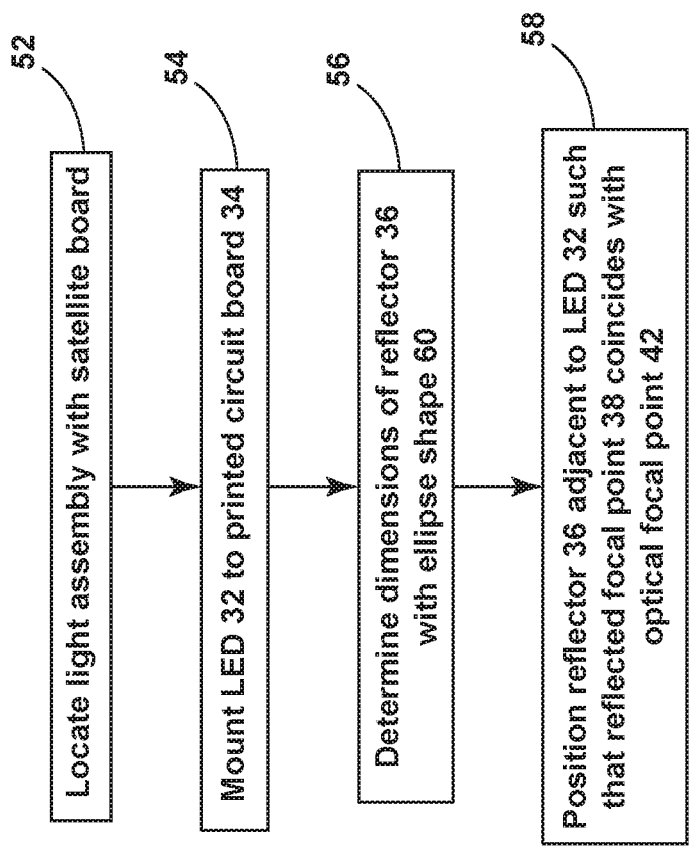
FIG. 3 is a flow chart of a method of configuring components of the light assembly of FIG. 1 to direct light using an LED as a light source without mounting the LED to a satellite board, that is, mounting the LED directly to a printed circuit board.

Referring to FIG. 3, a novel method of configuring components of the light assembly 16 to direct light 18 provided by the light assembly 16 to the target illuminance area 26 within the interior 12 of the vehicle 10 using the LED 32 as a light source 30 of the light assembly 16 without mounting the LED 32 to a satellite board (not illustrated) (that is, directly to a printed circuit board 34) is herein presented. As mentioned, a satellite board is commonly used to place an LED closer to the optical focal point of the optical device toward which the LED is intended to emit light. The satellite board is electrically connected between a printed circuit board and the LED. This novel method eliminates the need to use a satellite board between the printed circuit board 34 and the LED 32 to place the LED 32 sufficiently close to the optical device 40 to provide light 18 appropriate for reading.

The method, at step 52, includes locating a light assembly that utilizes (e.g., is designed to use) a satellite board between the LED 32 and the printed circuit board 34. For example, such a light assembly may be located at the overhead console 14. The printed circuit board 34 may be held in a fixed position by a structural support 44 (see FIG. 2). The method, at step 54, further includes mounting the LED 32 on the printed circuit board 34. The printed circuit board 34 may remain in its initial position, for example still held in place by the structural support 44 (see again FIG. 2). The optical device 40 likewise may remain in its initial position, for example held in place by a structural support 48. The optical device 40 has a known or determinable optical focal point 42. The method, at step 56, further includes determining the dimensions of the reflector 36 with an ellipse shape 60 (i.e., an elliptical reflector) that reflects the light 18 that the light source 30 of the LED 32 emits to a reflected focal point 38 that at least approximately coincides with the optical focal point 42 of the optical device 40. The dimensions of an elliptical reflector are a function of the position of two focal points. Here, the two focal points are (1) the light source 30 (assuming one LED 32 with one light source 30 is used) and (2) the optical focal point 42 (because the point is to make the reflected focal point 38 of the reflector 36 coincide with the optical focal point 42). From these two focal points, the dimensions of the reflector 36 with an ellipse shape 60 can be determined. The method, at step 58, further includes positioning the reflector 36 adjacent the LED 32 such that the reflected focal point 38 at least approximately coincides with the optical focal point 42. If these steps are followed, then the light assembly that formerly utilized (e.g., was designed to utilize) the satellite board is now the light assembly 16 that utilizes the LED 32 mounted upon the printed circuit board 34 while maintaining the optical device 40 and the printed circuit board 34 in their initial positions. Instead of physically moving the LED 32 closer to the optical focal point 42 of the optical device 40 with a satellite board, the reflector 36 is utilized to reflect the light 18 from the light source 30 of the LED 32 to the optical focal point 42. In other words, the support structure 44 and support structure 48 and can remain as they were when the satellite board was implemented but, now, with this novel method, the satellite board is unnecessary.

It should be understood that the embodiments of the light assembly 16 disclosed herein need not be located at the overhead console 14 and the target illuminance area 26 can be located anywhere in the interior 12.

What is claimed is:

1. A vehicle comprising:
   an interior;
   an overhead console accessible from the interior; and
   a light assembly providing light from the overhead console to the interior, the light assembly comprising:
   a printed circuit board;
   an LED light source that emits the light, the LED light source mounted to the printed circuit board;
   an elliptical reflector that reflects the light emitted by the LED light source to a reflected focal point; and
   a non-reflective lens having an incident surface and an exit surface, at least one of which is planar, and an optical focal point that is at least approximately the same as the reflected focal point, the light propagating from the reflected focal point directly to the incident surface and through the non-reflective lens;
   wherein, the light exiting the non-reflective lens is more collimated not orthogonally to the printed circuit board; and
   wherein, a distance between the printed circuit board and the non-reflective lens is 10 millimeters or longer.

2. The vehicle of claim 1 further comprising a seating assembly in the interior, wherein the light assembly directs the light provided by the light assembly toward the seating assembly.

3. A method of configuring components of a light assembly to direct light provided by the light assembly to a target illuminance area within an interior of a vehicle using an LED as a light source of the light assembly without mounting the LED to a satellite board comprising:
   mounting an LED on a printed circuit board;
   determining dimensions of an elliptical reflector that reflects light that a light source of the LED emits to a reflected focal point that at least approximately coincides with an optical focal point of a non-reflective lens that is a distance 10 millimeters or longer away from the printed circuit board, the non-reflective lens having an incident surface and an exit surface, at least one of which is planar, the light propagating from the reflected focal point directly to the incident surface and through the non-reflective lens;
   positioning the elliptical reflector adjacent the LED such that the reflected focal point at least approximately coincides with the optical focal point; and
   positioning the non-reflective lens so that light exiting the non-reflective lens is more collimated not orthogonally to the printed circuit board.

4. The method of claim 3, wherein the light directed to the target illuminance area is appropriate for reading.

5. The method of claim 3 wherein the vehicle further comprises an overhead console and the light assembly provides light from the overhead console to the interior.

6. The method of claim 3, wherein the vehicle further comprises a seating assembly in the interior and the target illuminance area is between the seating assembly and the light assembly; and
   wherein the dimensions of the elliptical reflector reflect the light to a reflected focal point that coincides with the optical focal point of the non-reflective lens and the elliptical reflector is positioned adjacent the LED such that the reflected focal point coincides with the optical focal point.

* * * * *